US010649989B2

(12) United States Patent
Lereya et al.

(10) Patent No.: US 10,649,989 B2
(45) Date of Patent: May 12, 2020

(54) BUILDING COMPLEX HIERARCHICAL QUERIES

(71) Applicant: International Business Machines Corporation, Armonk, NY (US)

(72) Inventors: Daniel Lereya, Tel Aviv (IL); Nadav Parag, Rehovot (IL); Vladimir Shalikashvili, Petah-Tiqwa (IL); Moshe Zemah, Rishon LeZion (IL)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 14/927,951

(22) Filed: Oct. 30, 2015

(65) Prior Publication Data
US 2017/0124146 A1  May 4, 2017

(51) Int. Cl.
  *G06F 16/2452*  (2019.01)
  *G06F 16/901*  (2019.01)
  *G06F 16/242*  (2019.01)

(52) U.S. Cl.
  CPC ...... *G06F 16/2452* (2019.01); *G06F 16/2428* (2019.01); *G06F 16/9024* (2019.01)

(58) Field of Classification Search
  None
  See application file for complete search history.

(56) References Cited

U.S. PATENT DOCUMENTS

| | | | |
|---|---|---|---|
| 7,644,371 B2 | 1/2010 | Robertson et al. | |
| 2005/0015368 A1 | 1/2005 | Payton et al. | |
| 2009/0144262 A1 | 6/2009 | White et al. | |
| 2009/0216728 A1* | 8/2009 | Brainerd | G06F 17/30554 |
| 2011/0276588 A1* | 11/2011 | Moon | G06F 16/832 707/769 |
| 2014/0156638 A1* | 6/2014 | Joshi | G06F 17/30566 707/722 |
| 2016/0170999 A1* | 6/2016 | Cuddihy | G06F 17/3056 707/722 |

* cited by examiner

*Primary Examiner* — Giuseppi Giuliani
(74) *Attorney, Agent, or Firm* — Janaki K. Davda; Konrad, Raynes, Davda and Victor LLP

(57) ABSTRACT

Provided are a computer program product, system, and method for building complex hierarchical queries. A User Interface (UI) representation of a logical query is received, wherein the UI representation describes object types, relationships between the object types, and attributes of the object types. The UI representation is translated to a logical query. The logical query is converted to data layer calls to retrieve objects having the object types, the relationships between the object types, and the attributes of the object types. The objects are received. Then, a directed graph is generated using the identified objects.

18 Claims, 10 Drawing Sheets

BUILDING COMPLEX HIERARCHICAL QUERIES

BACKGROUND OF THE INVENTION

1. Field of the Invention

Embodiments of the present invention relate to a computer program product, computer system, and method for building complex hierarchical queries. In particular, embodiments relate to a computer program product, computer system, and method for a query language that supports simplified building of complex hierarchical queries using an automatically generated query builder User Interface (UI).

2. Description of the Related Art

The need for searching and filtering objects according to their properties and relationships in applications is very common. Answering this need usually requires a user to write complex queries using a proprietary language that has its own syntax and set of rules. A problem with proprietary languages is that their learning curve is usually steep and addresses programmers/advanced users.

SUMMARY

Provided are a computer program product, system, and method for building complex hierarchical queries. A User Interface (UI) representation of a logical query is received, wherein the UI representation describes object types, relationships between the object types, and attributes of the object types. The UI representation is translated to a logical query. The logical query is converted to data layer calls to retrieve objects having the object types, the relationships between the object types, and the attributes of the object types. The objects are received. A directed graph is generated using the identified objects.

Thus, embodiments enable the use of a logical query that allows filtering objects by their attributes, relationships to other objects, and attributes of those related objects. Embodiments generate a directed graph for visualization of the logical query using objects retrieved based on the filtering.

With further embodiments, a query builder UI is generated that is used to build the UI representation of the logical query. Thus, embodiments enable creating very complex queries (agnostic to the actual object type) using this simplified and auto generated query builder UI.

With further embodiments, the query builder UI displays, for an object type, attributes of that object type and other object types that are related to that object type. This enables easy selection by a user of attributes and related object types.

With further embodiments, the identified objects are vertices of the directed graph, and the relationships are directed edges of the directed graph. This enables a user to quickly and easily visualize the relationships of the objects.

With further embodiments, the one or more attributes are displayed in the directed graph. This enables a user to easily visualize the attributes in the context of the objects and their relationships.

With further embodiments, an external configuration file describes the object types, the relationships between the object types, and the attributes of the object types. This allows saving this information together in a file for easy access.

With further embodiments, the objects are retrieved from a database using information in the external configuration file. This enables saving information in the external configuration file to retrieve the objects.

With further embodiments, the directed graph is translated into the UI representation of the logical query. Thus, embodiments provide an easy transformation between a directed graph of the logical query and a corresponding UI representation, which is bidirectional.

DETAILED DESCRIPTION

Embodiments enable creating very complex queries (agnostic to the actual object type) using a simplified and auto generated query builder UI. These queries allow filtering objects by their attributes (properties), relationships to other objects, and attributes (properties) of those related objects. Embodiments enable a unique user experience due to simplicity of the process of building the logical query.

Figure 1:
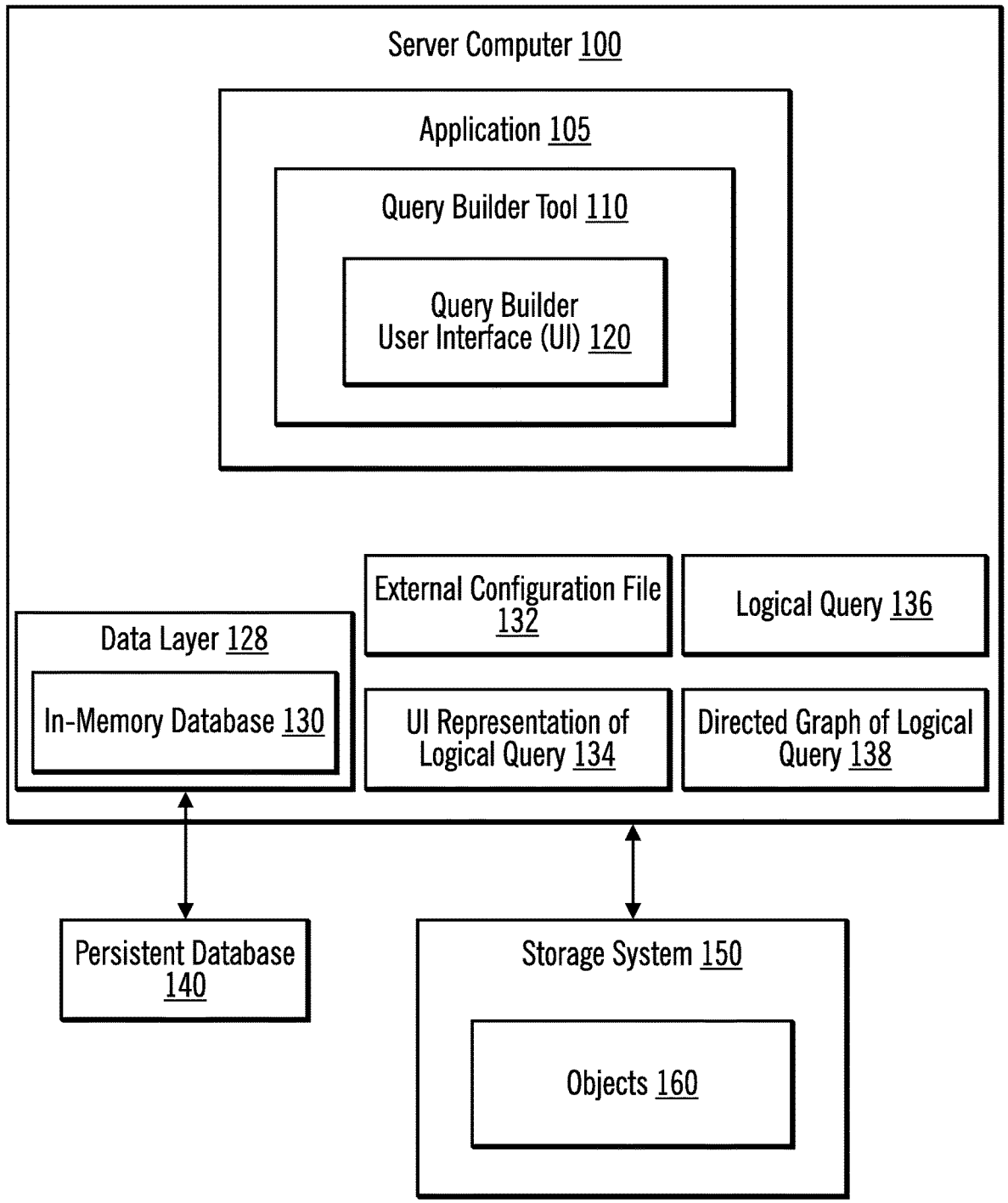
FIG. 1 illustrates, in a block diagram, a computing environment in accordance with certain embodiments.

FIG. 1 illustrates, in a block diagram, a computing environment in accordance with certain embodiments. In FIG. 1, a server computer 100 includes an application 105 that includes a query builder tool 110. The server computer 100 also includes an in-memory database 130, an external configuration file 132, a UI representation of a logical query 134, the logical query 136, and a directed graph 138 generated of the logical query. The server computer 100 may be coupled to a persistent database 140. A data layer 128 translates a logical query to a call into the in-memory data base 130, a call into the persistent database 140 or a call into another data source. The data layer 28 may be described as a gate to a data source (e.g., in-memory data base 130 or the persistent database 140). The query builder tool 110 provides a query builder UI 120. The server computer 100 is coupled to storage system 150, which stores objects 160. With embodiments, objects may be any kind of logical objects have attributes and relationships between them. In certain embodiments, the objects are objects in a storage management system, such as volumes and disks. In certain embodiments, objects are elements (e.g., user profiles) in a social media network, and the query builder tool 110 allows building a query such as: "all the users above age 30, with blue eyes and that has a friend who lives in Israel".

The query builder tool 110 allows building a logical query and represents the logical query with a directed graph. The query builder tool 110 provides an easy transformation between a directed graph of the logical query and a corresponding UI representation, which is bidirectional. That is, the query builder tool 110 allows going from the directed graph to the UI representation and from the UI representation to the directed graph. The logical query is one that allows filtering objects by their attributes, relationships to other objects, and attributes of those objects.

With embodiments, the logical query representation uses a rooted directed graph to represent the logical query where:
  each vertex in the directed graph represents an "object type";
  each (directed) edge in the directed graph represents a "relation" between object types (e.g., A to B is a relation of A to B, that may be different from B to A);
  each vertex also has "attributes" that specify additional attributes that the respective object type may have; and
  a root object type determines a main element of the query (i.e., this will be the type of the objects in the filtered result set).

Figure 2:
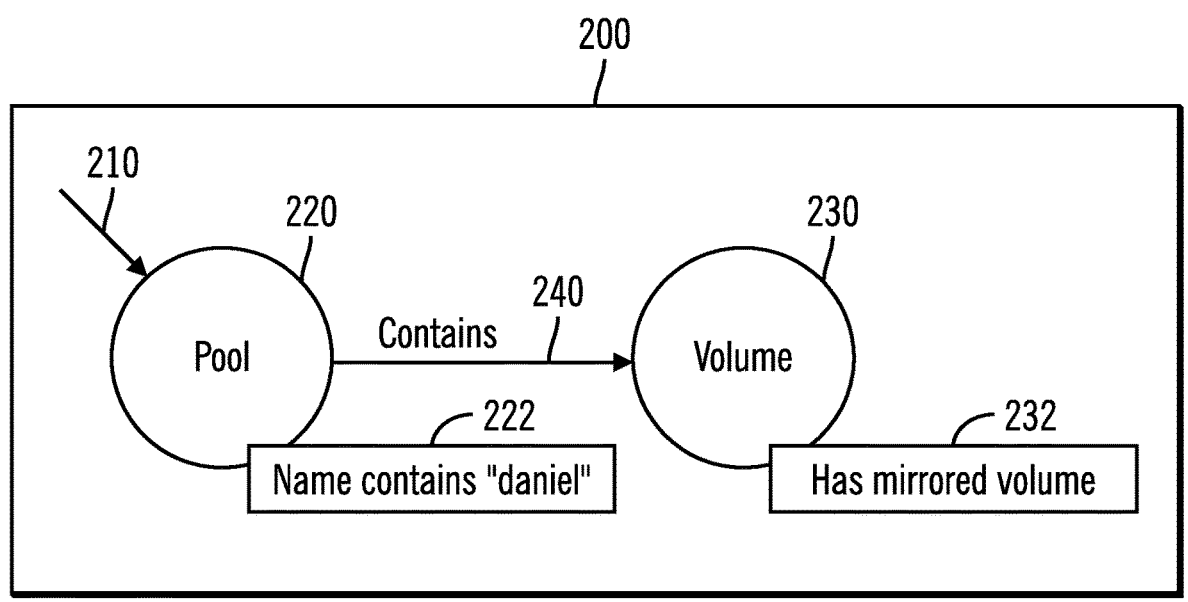
FIG. 2 illustrates a directed graph in accordance with certain embodiments.

FIG. 2 illustrates a directed graph 200 in accordance with certain embodiments. In the directed graph 200 of FIG. 2, the root is a directed edge 210 that points to a vertex "Pool" 220. The vertex "Pool" 220 is coupled to the vertex "Volume" 230 by a directed edge 240. The vertex "Pool" 220 has an attribute 222 "Name contains Daniel". The vertex "Volume" 230 has an attribute 232 "Has mirrored volume". The directed graph 200 represents the following filter criteria: all the pools for which the name contains "Daniel" and that contains one or more volumes that have at least one mirrored volume.

Figure 3A:
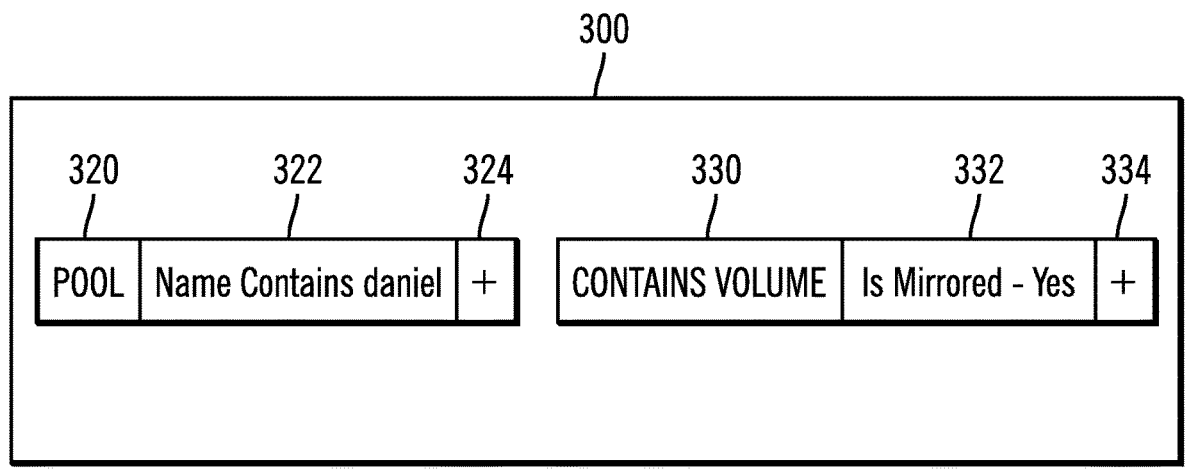
FIGS. 3A, 3B, and 3C illustrate elements of a query builder UI for generating a UI representation of a logical query in accordance with certain embodiments.
Figure 3B:
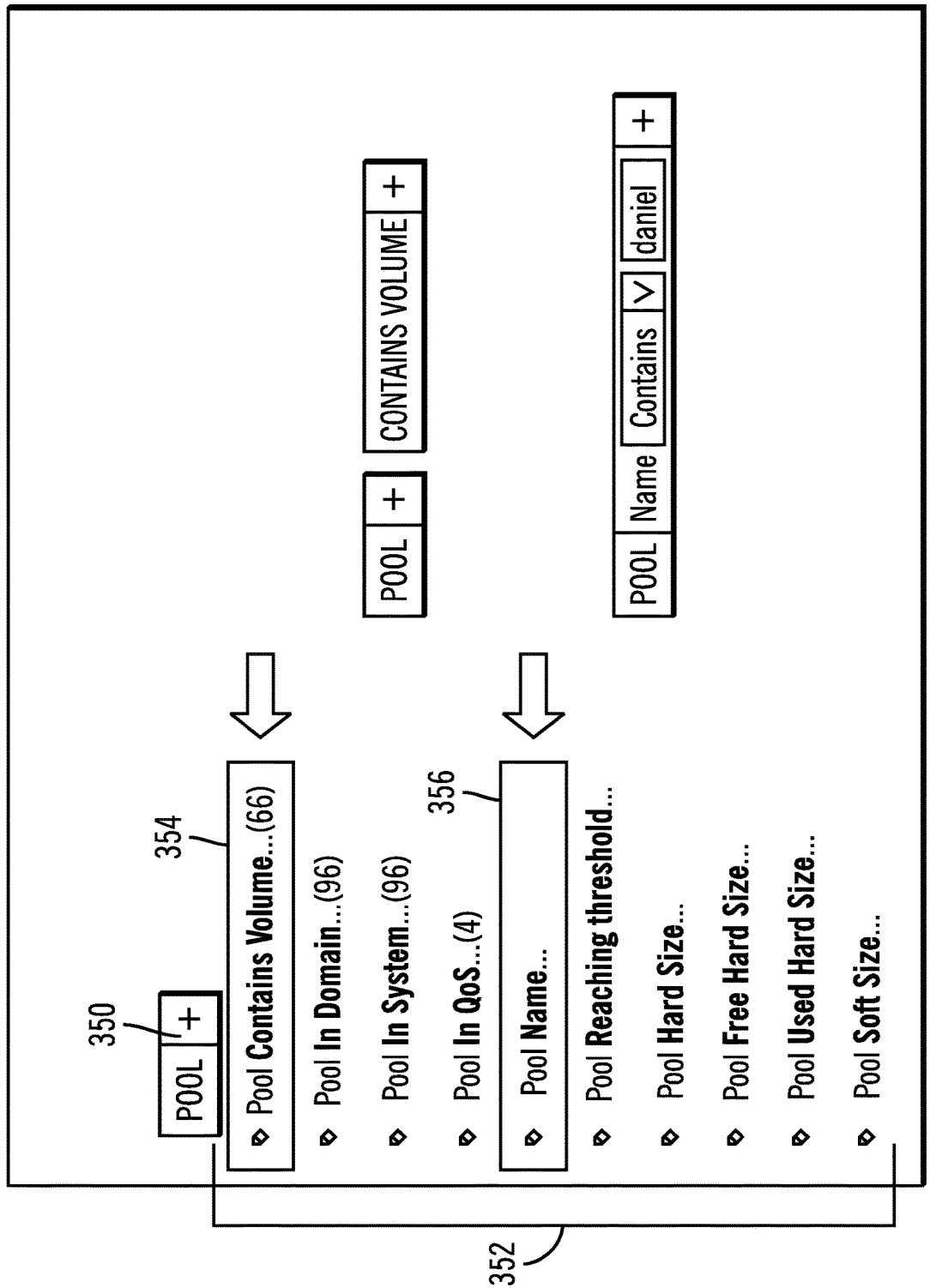
Figure 3C:
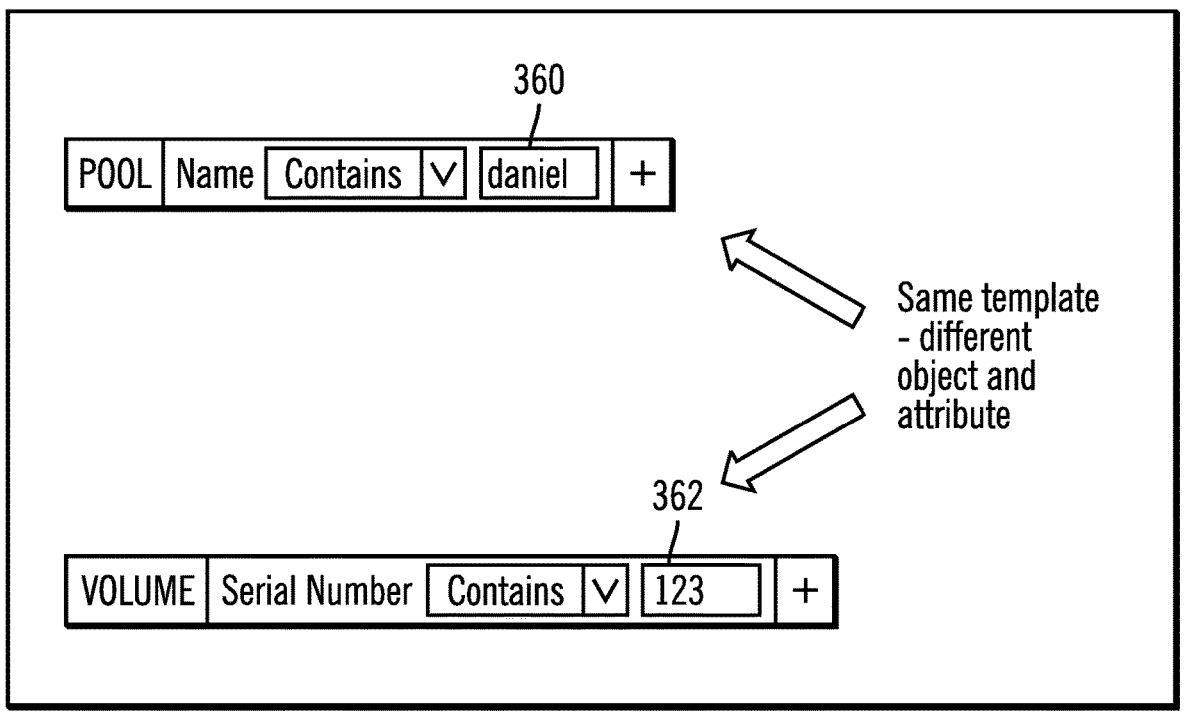

FIGS. 3A, 3B, and 3C illustrate elements of a query builder UI for generating a UI representation of a logical query in accordance with certain embodiments. In FIG. 3A, the UI representation 300 is designed in a way that every logic element in the query has a corresponding UI representation. In other words, there is a bijective function from the logic query structure to the UI representation. The UI representation 300 has "Pool" 320 with "Name contains Daniel" 322. The UI representation 300 also has "Contains Volume" 330 (because the Pool contains a Volume in the directed graph 200) with "Is Mirrored—Yes". Thus, the UI representation 300 reflects the directed graph 200. With embodiments, the indicators ("plus" signs in this example) 324, 334 may be selected to add a new attribute or to add a new related object type and relationship.

In FIG. 3B, selection of indicator 350 results in the list 352 of related object types and attributes for the "Pool" object type. Selection of indicator 354 from the list 352 results in adding a related volume object type with a contains relationship ("Contains Volume"). Also, in FIG. 3B, selection of indicator 356 from list 352 enables adding an attribute of a name for the "Pool" object type. For related objects, the directed graph may be one or more of:
1. A→B→C
2. A→B
   A→C
   A→ . . .

Thus, each object type may have an unlimited number of attributes and/or related object types. The format of (1) may be presented as a long filter, whereas each relation in format (2) may be an additional line in the filter.

FIG. 3C illustrates that the UI elements 360 for a Pool object type and the UI elements 362 for a Volume object type have different attributes and related object types. Thus, with embodiments, the structure is generic and, with a close set of filter "bubble" structures, embodiments are able to represent most filtering criteria.

Therefore, the UI representation 300 allows a user the ability to create complex queries about object type attributes and their related object types (and their attributes) in a simple and intuitive manner.

In order to have such a filter, in certain embodiments, the user supplies the following information:
  1. The object types of objects.
  2. The relationships between each object type to the other object types.
  3. The attributes that are available for each object type.

Figure 4:
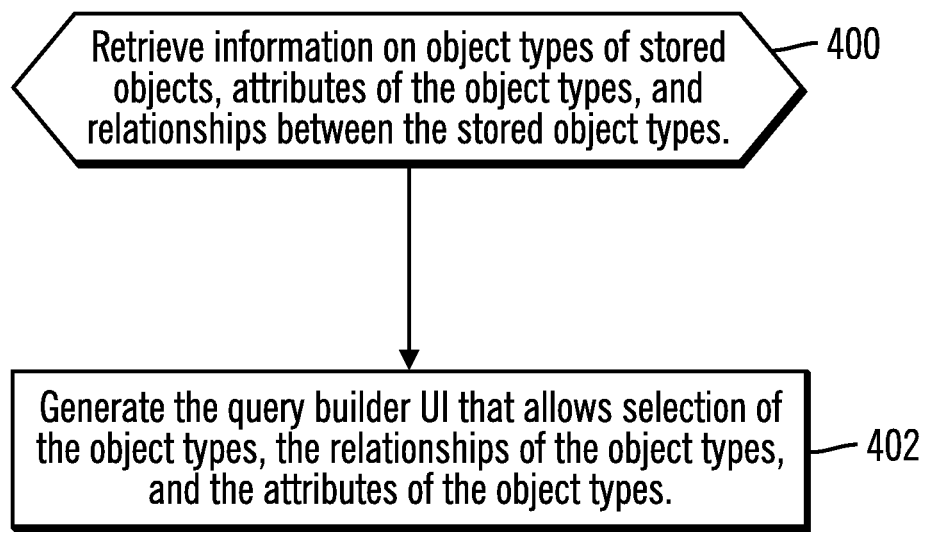
FIG. 4 illustrates, in a flowchart, operations for generating a query builder UI in accordance with certain embodiments.

FIG. 4 illustrates, in a flowchart, operations for generating a query builder UI representation in accordance with certain embodiments. Control begins at block 400 with the query builder tool 110 retrieving information on object types of stored objects, attributes of the object types, and relationships between the object types. In certain embodiments, a user defines the object types, the attributes of the object types, and the relationships between the object types. This information may be statically defined in a separate file (e.g., an external configuration file) or may be provided dynamically by the user (e.g., in learning systems).

With embodiments, the actual objects' storage does not have to change. In certain embodiments, the objects are loaded from the storage system into the server computer's in-memory database. In other embodiments, the objects may not be loaded into the in-memory database or may be loaded elsewhere for processing.

In block 402, the query builder tool 110 generates the query builder UI 120 that allows selection of the object types, the relationships of the object types, and the attributes of the object types. Embodiments provide general templates for the different attributes and related object types according their UI structure (e.g., combobox+input, combobox+combobox+input, etc.), which are dynamically filled by the query builder tool 110 according to the specific object types, attributes, and related object types that have been defined. With embodiments, the query builder tool 110 is a query UI generator that generates the query builder UI 120. With embodiments, the query builder tool 110 is an encapsulated component that may be imported into any application (both the UI and logic parts). With embodiments, any application that desires to filter objects with attributes and relationships may use the query builder tool 110. For example, a social media application in which users have a social network for communicating with each other, may use the query builder tool 110 to build queries, such as: all the posts (objects) with writer=daniel (attribute) that were liked by person (relationship with person as the related object) who lives in India (attribute). With embodiments, the query builder tool 110 contains both the query language, the UI components, and a way of translating the UI representation of the logical query into a directed graph and vice versa. In addition, the query builder tool 110 may contain a thin interface data layer that every application implements and that is responsible for translating logical queries into the correct data layer calls in the application back end data layer. In certain embodiments, each query is interpreted as one or more calls to the in memory database.

Figure 5:
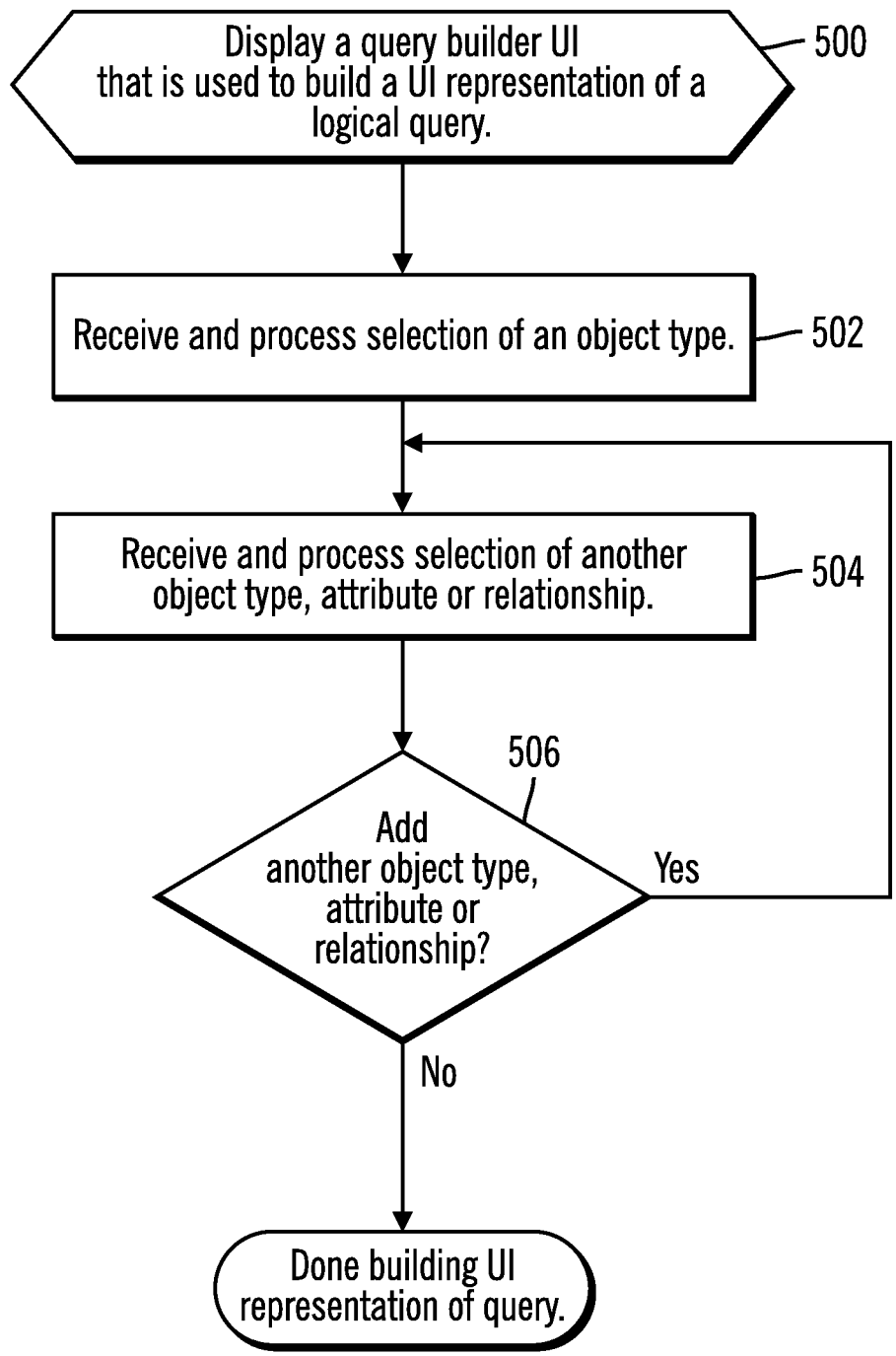
FIG. 5 illustrate, in a flowchart, operations for generating a UI representation of a logical query in accordance with certain embodiments.

FIG. 5 illustrates, in a flowchart, operations for generating a UI representation of a logical query in accordance with certain embodiments. Control begins at block 500 with the query builder tool 110 displaying the query builder UI 120 that is used to build a logical query. This is the query builder UI 120 generated in block 402 of FIG. 4.

In certain embodiments, to render the query builder UI 120, the query builder tool 110 may generate configuration pages having user interface controls and content loaded into the query builder UI 120. These pages may be rendered using Hypertext Markup Language (HTML), Extended Markup Language (XML) and additional software frameworks that render graphics and other user interface components, such as ActiveX®, Adobe Flash®, JavaFX®, Java® Applets, JavaScript®, etc. (In many countries, ActiveX is a registered trademark of Microsoft Corporation; Adobe Flash is a registered trademark of Adobe Systems Inc.; and Java, JavaScript, and JavaFX are registered trademarks of Oracle America, Inc.) The query builder UI 120 may comprise a computer program suitable for rendering configuration pages of user interface controls, such as a web browser or desktop application program.

In block 502, the query builder tool 110 receives and processes selection of an object type from the query builder UI 120. In block 504, the query builder tool 110 receives and processes selection of another object type, attribute (of the object type of block 502 or another object type) or relationship. In block 506, the query builder tool 110 determines whether there is another object type, attribute relationship to be added. If so, processing continues to block 504, otherwise, processing to build the UI representation of the logical query is done.

Figure 6:
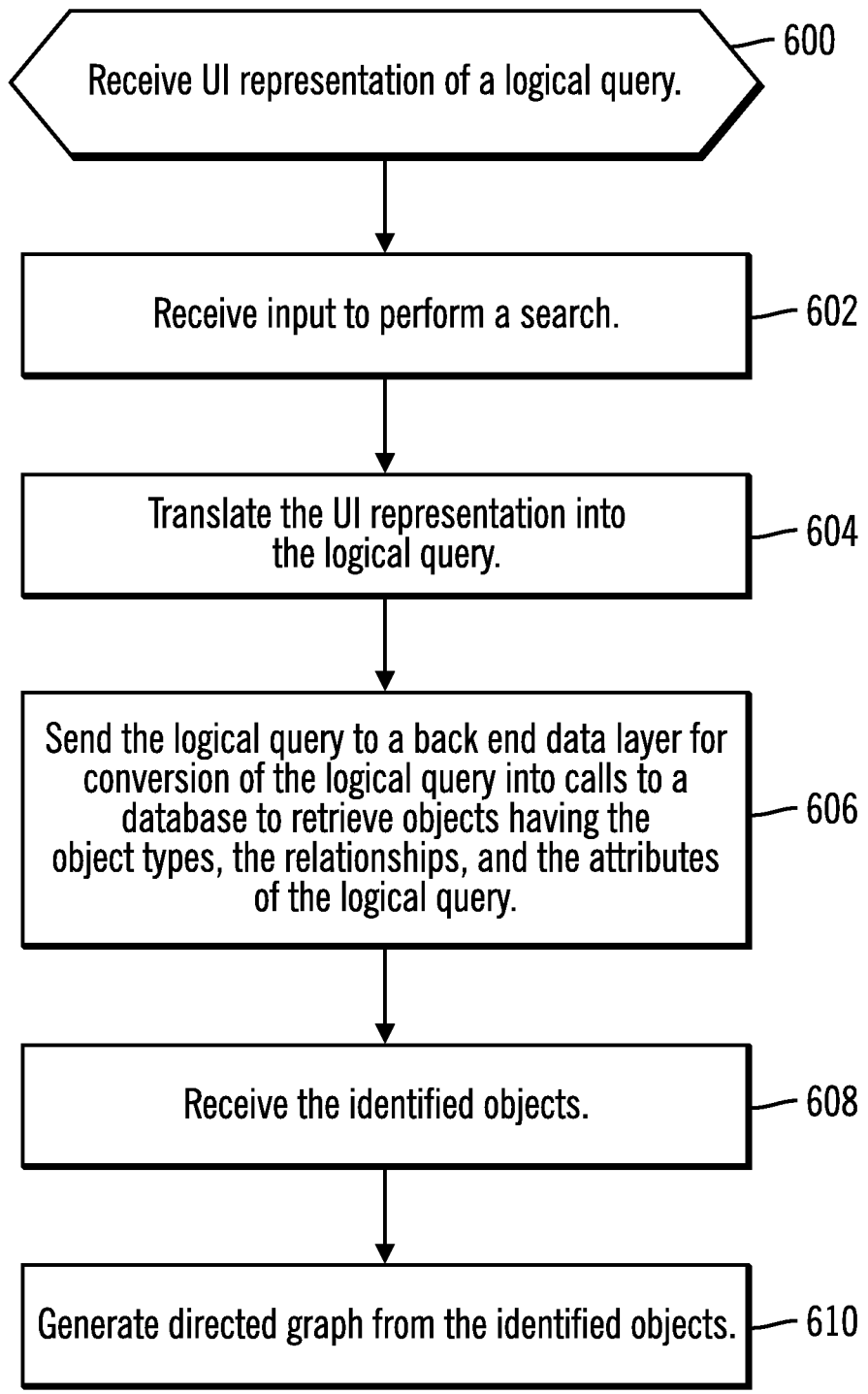
FIG. 6 illustrates, in a flowchart, operations for generating a directed graph in accordance with certain embodiments.

FIG. 6 illustrates, in a flowchart, operations for generating a directed graph in accordance with certain embodiments. Control begins at block 600 with the query builder tool 110 receiving a UI representation of a logical query. In block 602, the query builder tool 110 receives input to perform a search (e.g., receives a "start search" selection by a user). In block 604, the query builder tool 110 translates the UI representation into the logical query.

In block 606, the query builder tool 110 sends the logical query to a back end data layer for identifying objects having the object types, the relationships, and the attributes of the logical query. With embodiments, the back end data layer converts the logical query to the relevant calls to the database. In certain embodiments, for a given query A→B→C, where A has a relationship with B, which has a relationship with C:
1) the appropriate query predicates for A's attributes are built and then applied to obtain objects for A from the database (e.g., using Attribute Descriptor, which is a definition to how to create the predicate and is part of the external configuration file);
2) the appropriate query predicates for B's attributes are built and then applied to obtain objects for B from the database;
3) a join is calculated for the objects for A and the objects for B (using a Join helper, which is also in the external configuration file); and
4) the result of the join is used to perform the same process with the objects obtained for →C (after the appropriate query predicates for C's attributes are built and then applied to obtain objects for C from the database).

The data layer is flexible and may be implemented in any way (e.g., using Structured Query Language (SQL)).

In block 608, the query builder tool 110 receives the identified objects. In block 610, the query builder tool 110 generates a directed graph from the identified objects.

In certain embodiments, each object identified by executing the logical query is a vertex, and each relation identified for that object is a directed graph. Attributes of each object identified by executing the logical query are also displayed in the directed graph.

Embodiments provide a user experience query language that is a non-standard, very flexible and very extendible solution for a wide variety of applications that requires data filtering by providing modern and flexible ways to filter any type of data in all kinds of data-aware applications using queries. Specifically, embodiments include a query language with a structure that allows an admin/any user/module to easily build complex queries on object types and their related object types (not limited in the number of relations) and to supply an automatically generated query builder UI that provides a UI representation of a logical query.

Figure 7:
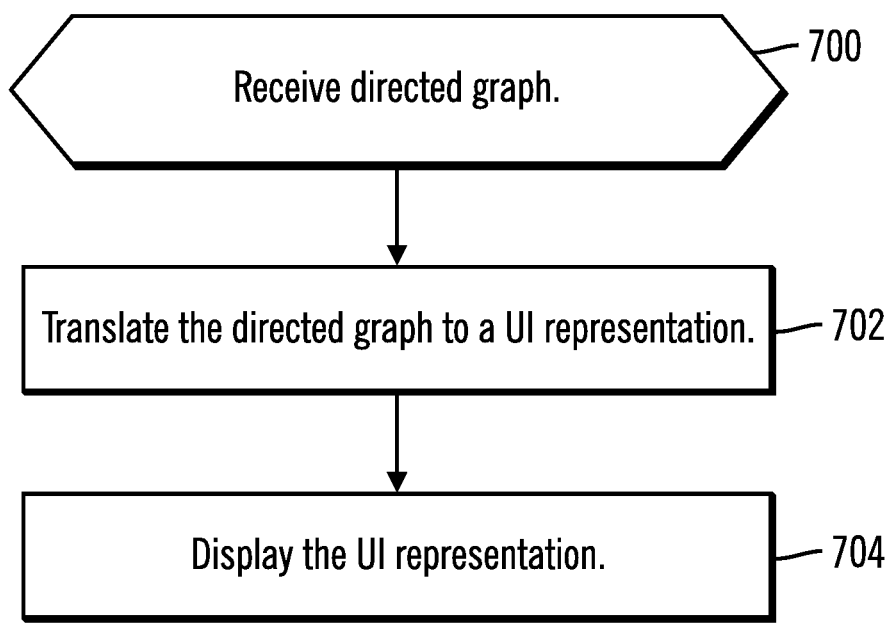
FIG. 7 illustrates, in a flowchart, operations for generating a UI representation from a directed graph in accordance with certain embodiments.

FIG. 7 illustrates, in a flowchart, operations for generating a UI representation from a directed graph in accordance with certain embodiments. Control begins at block 700 with the query builder tool 110 receiving a directed graph. In block 702, the query builder tool 110 translates the directed graph to a UI representation. In block 704, the query builder tool 110 displays the UI representation. In certain embodiments, this enables a user to make changes to the UI representation and generate a modified directed graph.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The letter designators, such as a, b, c, used to designate a number of instances of an element may indicate a variable number of instances of that element when used with the same or different elements.

Figure 8:
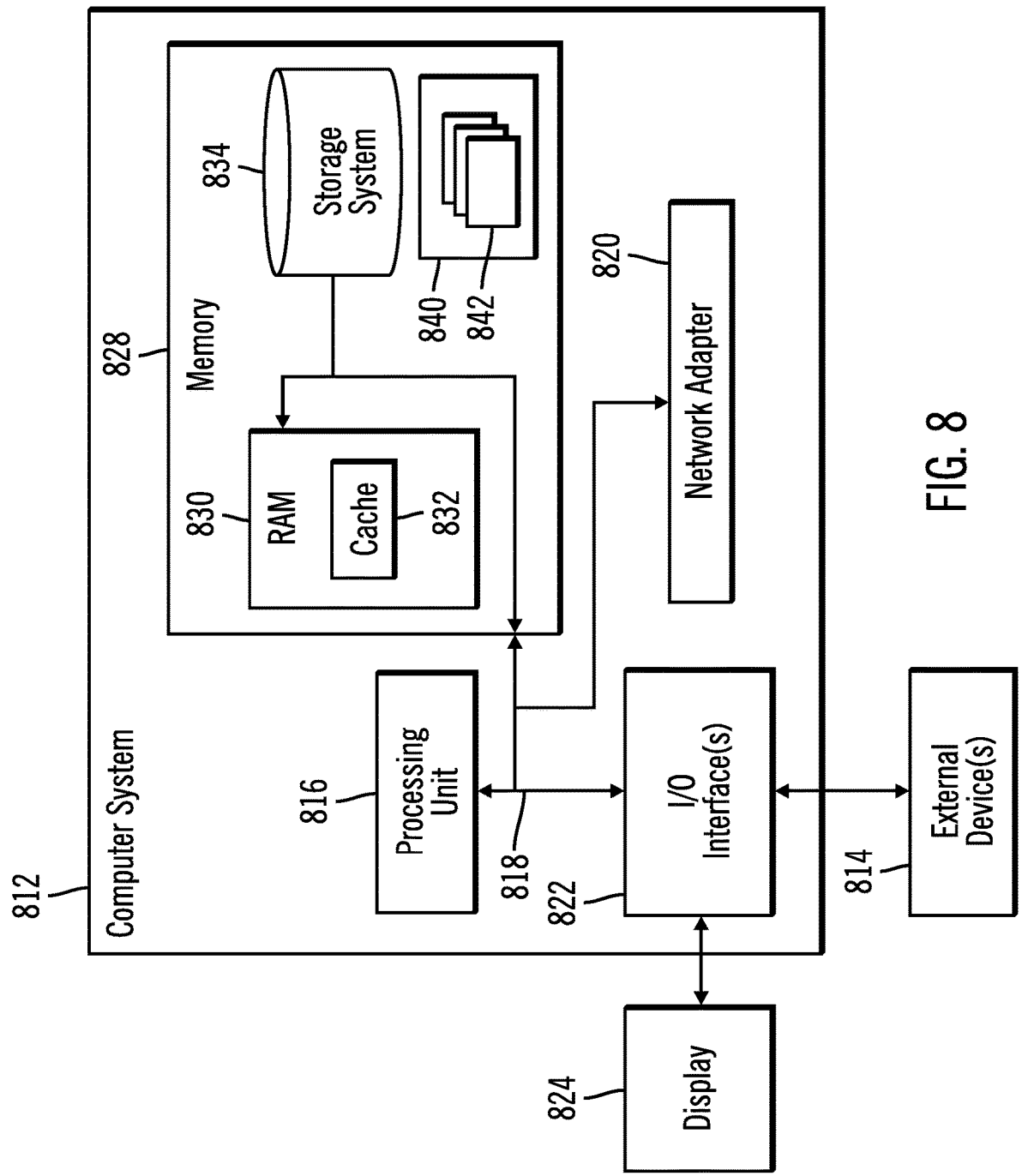
FIG. 8 illustrates a computing environment in which components of FIG. 1 may be implemented in accordance with certain embodiments.

The server computer 100 of FIG. 1 may each be implemented in a computer system, such as the computer system 812 shown in FIG. 8. Computer system 812 may be described in the general context of computer system executable instructions, such as program modules, being executed by a computer system. Generally, program modules may include routines, programs, objects, components, logic, data structures, and so on that perform particular tasks or implement particular abstract data types. Computer system 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system 812 is shown in the form of a general-purpose computing device. The components of computer system 812 may include, but are not limited to, one or more processors or processing units 816, a system memory 828, and a bus 818 that couples various system components including system memory 828 to one or more processors or processing units 816. Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 812 typically includes a variety of computer system readable media. Such media may be any available media that is accessible by computer system 812, and it includes both volatile and non-volatile media, removable and non-removable media.

System memory 828 can include computer system readable media in the form of volatile memory, such as random access memory (RAM) 830, which includes cache memory 832. Computer system 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. The components of the computer system 812 may be implemented as program modules 842 which generally carry out the functions and/or methodologies of embodiments of the invention as described herein.

Computer system 812 may also communicate with one or more external devices 814 such as a keyboard, a pointing device, a display 824, etc.; one or more devices that enable a user to interact with computer system 812; and/or any devices (e.g., network card, modem, etc.) that enable computer system 812 to communicate with one or more other computing devices. Such communication can occur via Input/Output (I/O) interfaces 822. Still yet, computer system 812 can communicate with one or more networks such as a local area network (LAN), a general wide area network (WAN), and/or a public network (e.g., the Internet) via network adapter 820. As depicted, network adapter 820 communicates with the other components of computer system 812 via bus 818. It should be understood that although not shown, other hardware and/or software components may be used in conjunction with computer system 812. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for, the computer program product comprising a computer readable storage medium having computer readable program code embodied therein that executes to perform operations, the operations comprising:

retrieving object types of stored objects, attributes of the object types, and relationships between the object types;

building a query builder User Interface (UI) using one or more templates to allow selection of the object types of the stored objects, the attributes of the object types, and the relationships between the object types;

in response to receiving, using the query builder UI, selection of one or more object types, one or more relationships between the object types, and one or more attributes of the object types, building a UI representation;

translating the UI representation to a logical query that filters for objects of the stored objects having the selected one or more object types, the selected one or more relationships between the object types, and the selected one or more attributes of the object types;

converting the logical query to data layer calls to retrieve objects having the object types, the relationships between the object types, and the attributes of the object types;

generating a directed graph using the objects retrieved by the data layer calls; and translating the directed graph to the UI representation, wherein the UI representation is modified to generate a modified directed graph.

2. The computer program product of claim 1, wherein the query builder UI displays, for an object type of the object types, attributes of that object type and other object types that are related to that object type.

3. The computer program product of claim 1, wherein the objects are vertices of the directed graph, and wherein the relationships are directed edges of the directed graph.

4. The computer program product of claim 1, wherein the attributes are displayed in the directed graph.

5. The computer program product of claim 1, wherein an external configuration file describes the object types, the relationships between the object types, and the attributes of the object types.

6. The computer program product of claim 5, wherein the objects are retrieved from a database using information in the external configuration file.

7. A computer system, comprising:
a processor;
a computer readable storage medium coupled to the processor and storing program code, wherein the program code, when executed, performs operations, the operations comprising:
retrieving object types of stored objects, attributes of the object types, and relationships between the object types;
building a query builder User Interface (UI) using one or more templates to allow selection of the object types of the stored objects, the attributes of the object types, and the relationships between the object types;
in response to receiving, using the query builder UI, selection of one or more object types, one or more relationships between the object types, and one or more attributes of the object types, building a UI representation;
translating the UI representation to a logical query that filters for objects of the stored objects having the selected one or more object types, the selected one or more relationships between the object types, and the selected one or more attributes of the object types;
converting the logical query to data layer calls to retrieve the objects having the object types, the relationships between the object types, and the attributes of the object types;
generating a directed graph using the objects retrieved by the data layer calls; and
translating the directed graph to the UI representation, wherein the UI representation is modified to generate a modified directed graph.

8. The computer system of claim 7, wherein the query builder UI displays, for an object type of the object types, attributes of that object type and other object types that are related to that object type.

9. The computer system of claim 7, wherein the objects are vertices of the directed graph, and wherein the relationships are directed edges of the directed graph.

10. The computer system of claim 7, wherein the attributes are displayed in the directed graph.

11. The computer system of claim 7, wherein an external configuration file describes the object types, the relationships between the object types, and the attributes of the object types.

12. The computer system of claim 11, wherein the objects are retrieved from a database using information in the external configuration file.

13. A method, comprising:
retrieving object types of stored objects, attributes of the object types, and relationships between the object types;
building a query builder User Interface (UI) using one or more templates to allow selection of the object types of the stored objects, the attributes of the object types, and the relationships between the object types;
in response to receiving, using the query builder UI, selection of one or more object types, one or more relationships between the object types, and one or more attributes of the object types, building a UI representation;
translating the UI representation to a logical query that filters for objects of the stored objects having the selected one or more object types, the selected one or more relationships between the object types, and the selected one or more attributes of the object types;
converting the logical query to data layer calls to retrieve objects having the object types, the relationships between the object types, and the attributes of the object types;
generating a directed graph using the objects retrieved by the data layer calls; and
translating the directed graph to the UI representation, wherein the UI representation is modified to generate a modified directed graph.

14. The method of claim 13, wherein the query builder UI displays, for an object type of the object types, attributes of that object type and other object types that are related to that object type.

15. The method of claim 13, wherein the objects are vertices of the directed graph, and wherein the relationships are directed edges of the directed graph.

16. The method of claim 13, wherein the attributes are displayed in the directed graph.

17. The method of claim 13, wherein an external configuration file describes the object types, the relationships between the object types, and the attributes of the object types.

18. The method of claim 17, wherein the objects are retrieved from a database using information in the external configuration file.

* * * * *